US011619166B2

(12) United States Patent
Matsunaga

(10) Patent No.: US 11,619,166 B2
(45) Date of Patent: Apr. 4, 2023

(54) ELECTRIC GENERATOR

(71) Applicant: HONDA MOTOR CO., LTD., Tokyo (JP)

(72) Inventor: Yoshihiro Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/573,167

(22) Filed: Jan. 11, 2022

(65) Prior Publication Data

US 2022/0243649 A1    Aug. 4, 2022

(30) Foreign Application Priority Data

Jan. 29, 2021   (JP) ............................. JP2021-013128

(51) Int. Cl.
| *F02B 63/04* | (2006.01) |
| *F02N 11/04* | (2006.01) |
| *F02M 25/08* | (2006.01) |
| *H02K 7/118* | (2006.01) |
| *H02K 7/00* | (2006.01) |

(52) U.S. Cl.
CPC .......... *F02B 63/042* (2013.01); *F02B 63/047* (2013.01); *F02M 25/0836* (2013.01); *F02M 25/0854* (2013.01); *F02N 11/04* (2013.01); *H02K 7/003* (2013.01); *H02K 7/118* (2013.01)

(58) Field of Classification Search
CPC .... F02B 63/042; F02B 63/074; F02B 63/048; F02M 25/0854; F02M 25/089; F02M 25/0872

See application file for complete search history.

(56) References Cited

U.S. PATENT DOCUMENTS

| 5,901,687 | A  | * | 5/1999  | Tasaki ..................... F02B 63/02 220/367.1 |
| 7,353,808 | B2 | * | 4/2008  | Kakoo .................... F16K 31/20 141/37 |
| 2008/0264391 | A1 | * | 10/2008 | Yamamoto ........... F02M 25/089 123/519 |
| 2008/0264501 | A1 | * | 10/2008 | Miyazaki ........... F02M 25/0854 137/590 |
| 2008/0290095 | A1 | * | 11/2008 | Kamoshita ......... F02M 37/0082 220/567.2 |
| 2009/0314261 | A1 | * | 12/2009 | Hasebe .................. F02M 35/04 123/520 |
| 2011/0056255 | A1 | * | 3/2011  | Okabe ..................... B62B 5/067 70/211 |
| 2011/0057401 | A1 | * | 3/2011  | Okabe ..................... B62B 5/067 280/47.17 |
| 2015/0075469 | A1 | * | 3/2015  | Suzuki .................. F02F 7/0043 123/90.6 |

(Continued)

FOREIGN PATENT DOCUMENTS

JP        2008-240638        10/2008

*Primary Examiner* — Logan M Kraft
*Assistant Examiner* — Anthony L Bacon
(74) *Attorney, Agent, or Firm* — Rankin, Hill & Clark LLP

(57) ABSTRACT

An engine is arranged in a lower part of a housing, an alternator and a fan are coaxially joined to an output shaft of the engine, a recoil starter that starts the engine is arranged in front of the fan, a fuel tank is arranged in an upper part of the housing, and a canister containing activated carbon is arranged between the fuel tank and the output shaft.

4 Claims, 6 Drawing Sheets

(56) References Cited

U.S. PATENT DOCUMENTS

| | | | |
|---|---|---|---|
| 2015/0075476 A1* | 3/2015 | Suzuki | F02D 13/0269 |
| | | | 123/185.1 |
| 2015/0075480 A1* | 3/2015 | Suzuki | F01M 9/06 |
| | | | 123/193.6 |
| 2019/0329647 A1* | 10/2019 | Takata | F02M 25/0854 |

* cited by examiner

ELECTRIC GENERATOR

INCORPORATION BY REFERENCE

The present application claims priority under 35 U.S.C. § 119 to Japanese Patent Application No. 2021-013128 filed on Jan. 29, 2021. The content of the application is incorporated herein by reference in its entirety.

BACKGROUND OF THE INVENTION

Field of the Invention

The present invention relates to an electric generator.

Description of the Related Art

There is conventionally known a canister that is connected to a fuel tank and is configured to store evaporated fuel, which is fuel vaporized in the fuel tank, by absorbing it on activated carbon and to circulate the evaporated fuel through an intake system of an engine when the engine is operated (for example, Patent Literature 1).

In a conventional electric generator, inside a housing, such a canister is typically arranged in a narrow space in a neighborhood of an engine. In recent years, it has been demanded that a canister having an increased size be used so that absorption-desorption performance of the canister is improved.

CITATION LIST

Patent Literature

Patent Literature 1: Japanese Patent Laid-Open No. 2008-240638

In a case, however, where a canister having an increased size is used in the conventional electric generator, there is a possibility that the canister cannot be accommodated in its conventional arrangement position.

It is, therefore, an object of the present invention to solve the above-described conventional problem and to provide an electric generator in which a canister can be appropriately arranged in a housing.

SUMMARY OF THE INVENTION

An aspect of the present invention provides an electric generator in which an engine is arranged in a lower part of a housing, an alternator and a fan are coaxially joined to an output shaft of the engine, a recoil starter that starts the engine is arranged in front of the fan, a fuel tank is arranged in an upper part of the housing, and a canister containing activated carbon is arranged between the fuel tank and the output shaft.

Advantageous Effect of Invention

According to an aspect of the present invention, even a canister having an increased size can be appropriately arranged in a housing.

DETAILED DESCRIPTION OF THE PREFERRED EMBODIMENT

Figure 1:
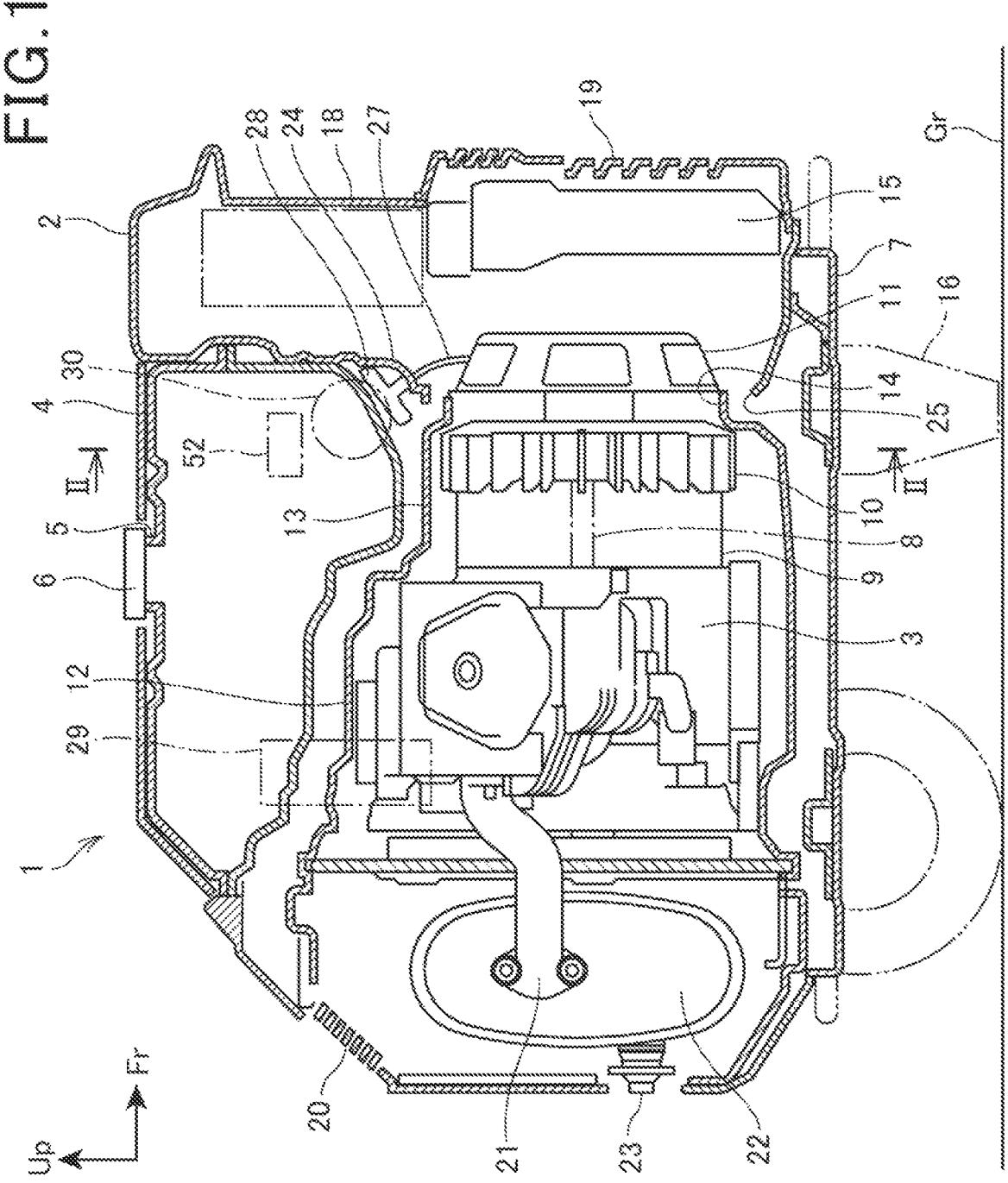
FIG. 1 is a side sectional view showing a schematic configuration of an interior of an electric generator according to an embodiment of the present invention.

With reference to the appended drawings, the following describes an embodiment of the present invention. In the appended drawings, reference character Up denotes an upper side, reference character Fr denotes a front side, and reference character Lh denotes a left side.

FIG. 1 is a side sectional view showing a schematic configuration of an interior of an electric generator 1 according to the embodiment of the present invention. In FIG. 1, reference character Gr denotes an installation surface on which the electric generator 1 is installed.

As shown in FIG. 1, the electric generator 1 includes a housing 2 made of resin. An engine 3 is housed inside the housing 2.

Furthermore, a fuel tank 4 is housed inside the housing 2. On a top plate of the housing 2, a refueling port 5 of the fuel tank 4 is provided to protrude to an exterior of the housing 2. A refueling cap 6 for opening/closing the refueling port 5 is detachably attached to the refueling port 5.

A support portion 16 for supporting the housing 2 is attached to a bottom cover 7 provided on a lower surface of the housing 2. The engine 3 is provided with an output shaft 8. An alternator 9 is mounted to the output shaft 8 of the engine 3 coaxially with the output shaft 8.

Furthermore, a fan 10 is coaxially mounted to the output shaft 8 in front of the alternator 9. A recoil starter 11 for starting the engine 3 is arranged in front of the fan 10. When the engine 3 is driven, the alternator 9 is driven to rotate to generate electricity. When the engine 3 is driven, the fan 10 is driven to rotate to take in air external to the housing 2 and blow the air toward the engine 3.

On an outer side of the engine 3, there is arranged a shroud 12 that guides air blown by the fan 10 to a periphery of the engine 3. A fan cover 13 for covering the alternator 9 and the fan 10 is arranged at a front end of the shroud 12. The fan cover 13 is formed in a tapered shape so as to have a smaller diameter on a front side thereof, and a ventilation opening 14 is formed at a front end of the fan cover 13.

The ventilation opening 14 is formed substantially concentrically with a rotation axis of the engine 3. An inverter 15 is installed in front of the fan 10. A control panel 18 on which a power source outlet, operation buttons, and so on are arranged is mounted to a front surface of the housing 2.

Furthermore, an intake port 19 for taking outside air into an interior of the housing 2 is formed on the front surface of the housing 2. An exhaust port 20 for exhausting air inside the housing 2 is formed on a rear surface of the housing 2. In the electric generator 1, the engine 3 is driven to drive the fan 10 to rotate so that air external to the housing 2 is taken in through the intake port 19.

The air taken in through the intake port 19 flows into an inner side of the fan cover 13 via the ventilation opening 14, cools the engine 3 while flowing between the engine 3 and the shroud 12, and then is discharged to the exterior through the exhaust port 20.

A muffler 22 is provided behind the engine 3 via an exhaust pipe 21.

The exhaust pipe 21 guides exhaust air from the engine 3 to the muffler 22, and the muffler 22 purifies the exhaust air and reduces exhaust noise.

The muffler 22 is provided with a tail pipe 23, and a rear end of the tail pipe 23 is exposed to the exterior from a back surface of the housing 2.

Furthermore, a partition 24 is provided between the ventilation opening 14 of the fan cover 13 and the recoil starter 11. The partition 24 is, for example, a plate-shaped member made of resin and separates the interior of the housing 2 into two spaces on a front side and a rear side. On the partition 24, at a position opposed to a front of the ventilation opening 14, there is provided a partition opening 25 that is an opening portion substantially equal in diameter to the ventilation opening 14.

In this embodiment, the partition 24 is formed integrally with the housing 2. Furthermore, a front end of the fuel tank 4 is in contact with one side surface of the partition 24 from a rear side of the housing 2.

An insertion hole 26 (FIG. 6) is provided at a location on the partition 24 close to the recoil starter 11. In this embodiment, the insertion hole 26 is provided at a position close to a side panel 60 (FIG. 2) forming one side surface of the housing 2 and close to a bottom of the fuel tank 4.

A recoil rope 27 whose one end is joined to the recoil starter 11 is inserted through the insertion hole 26. A recoil grip 28 is attached to the other end of the recoil rope 27.

In this embodiment, the side panel 60 is mounted to the housing 2 so as to be openable/closable via, for example, a hinge.

In starting the engine 3, with the side panel 60 opened, the recoil grip 28 is pulled to pull out the recoil rope 27, and thus a reel included in the recoil starter 11 rotates, so that a crankshaft of the engine 3 is driven to rotate as the reel rotates. This is how the engine 3 is started. After the engine 3 has been started, the reel of the recoil starter 11 reversely rotates, and thus the recoil rope 27 is rewound to pull back the recoil grip 28. The recoil grip 28 thus pulled back comes into contact with the insertion hole 26 to be stopped.

Figure 2:
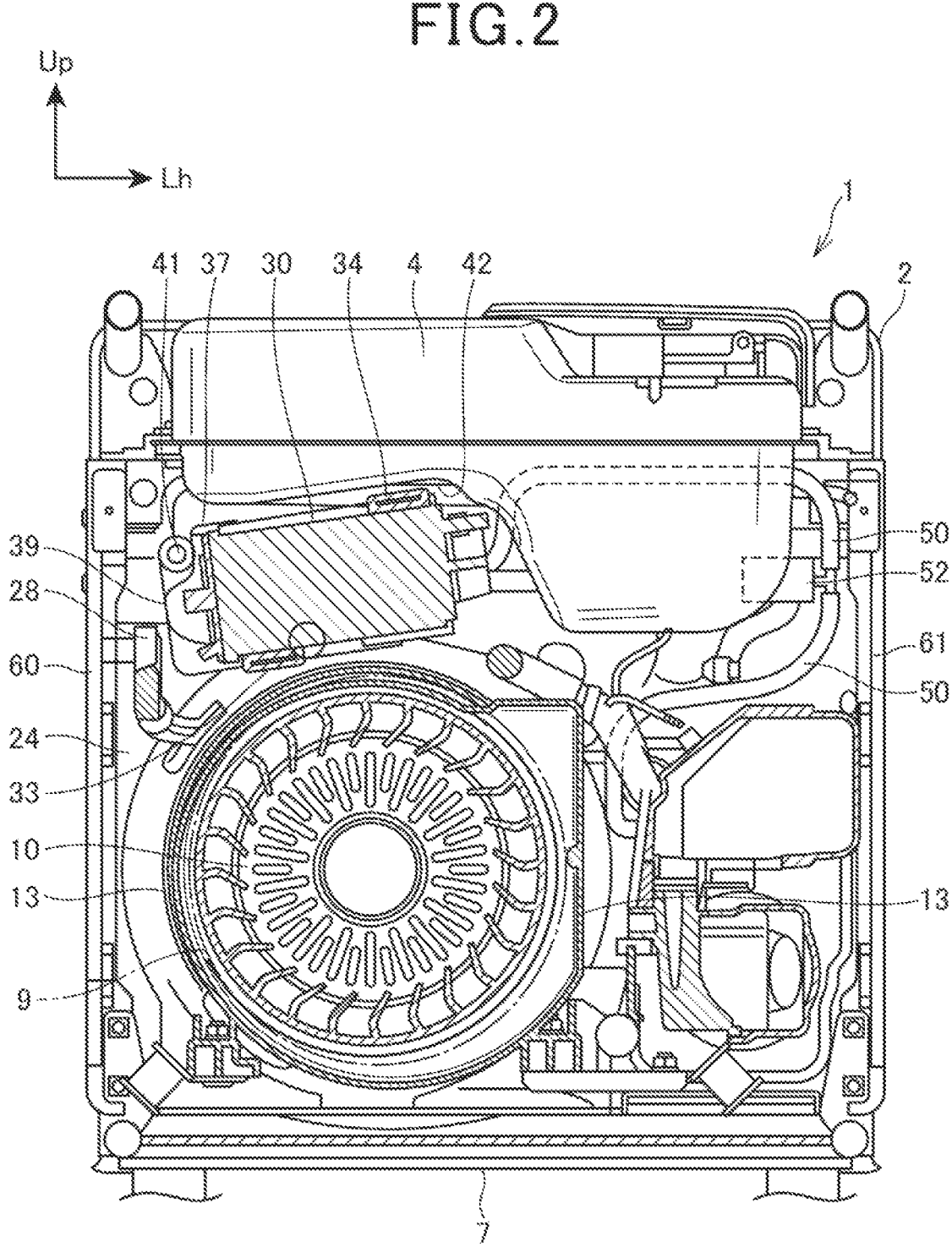
FIG. 2 is a sectional view taken along a line II-II in FIG. 1.

Inside the housing 2, an air cleaner 29 is provided between the engine 3 and the other side panel 61 (FIG. 2).

The air cleaner 29 is a sponge-like member formed by foaming a synthetic resin such as polyurethane. The air cleaner 29 removes dirt, dust, and so on from outside air supplied for combustion in the engine 3.

Specifically, when the engine 3 is started, outside air is taken into the interior of the housing 2 through, for example, a vent provided on the side panel 61. At this time, the outside air thus taken in passes through the air cleaner 29, and thus dirt, dust, and so on taken into the interior of the housing 2 at the same time are removed. The outside air that has passed through the air cleaner 29 is taken into a carburetor of the engine 3.

The outside air taken into the carburetor is used for combustion in the engine 3. A gas generated as a result of the combustion is discharged through the tail pipe 23 to the exterior of the housing 2 via the exhaust pipe 21 and the muffler 22.

FIG. 2 is a sectional view taken along a line II-II in FIG. 1.

As shown in FIG. 2, the engine 3, the alternator 9, and the fan 10 are arranged in a lower part of the housing 2. Furthermore, the fuel tank 4 is arranged in an upper part of the housing 2.

A canister 30 is arranged between the fuel tank 4 and the alternator 9. The canister 30 is a member that is formed in a cylindrical shape and contains activated carbon inside.

The canister 30 is configured to store evaporated fuel, which is fuel vaporized in the fuel tank 4, by absorbing it on the activated carbon.

In this embodiment, the canister 30 is arranged between the fuel tank 4 and a part of the fan cover 13 positioned above the alternator 9.

Figure 3:
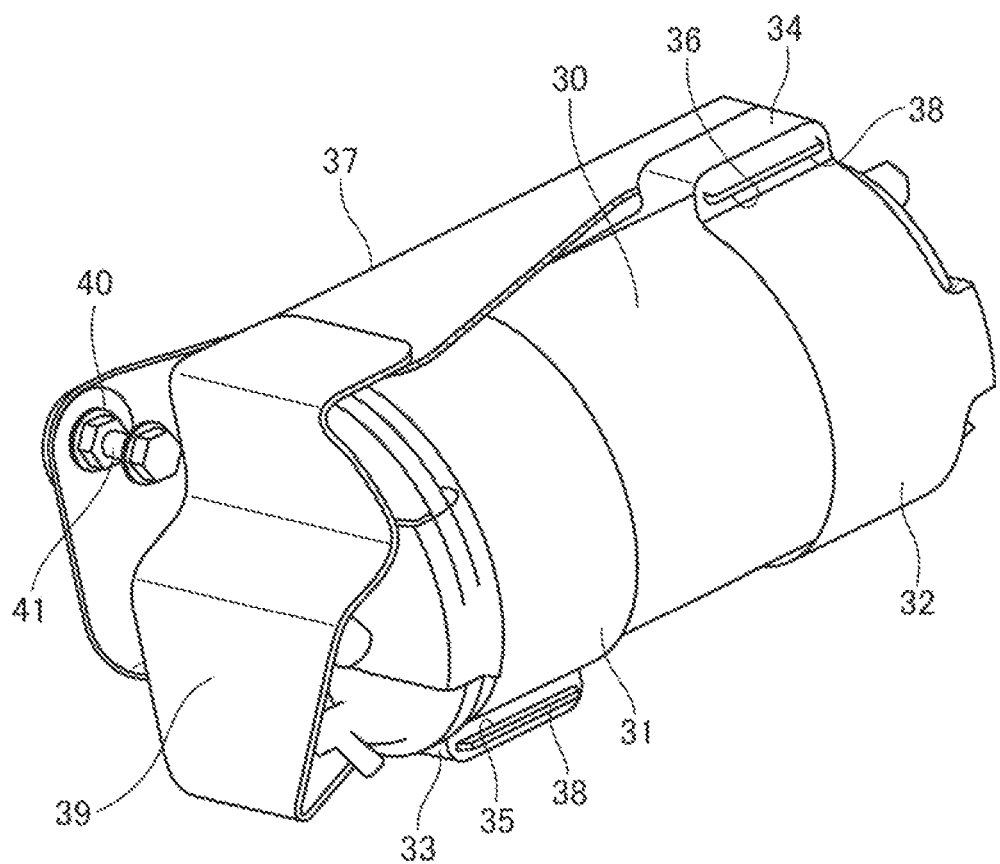
FIG. 3 is a perspective view of a canister.

FIG. 3 is a perspective view of the canister 30.

As shown in FIG. 3, an annular first rubber member 31 is fitted on one end side of the canister 30 in a longitudinal direction thereof. Similarly, a second rubber member 32 substantially equal in shape to the first rubber member 31 is fitted on the other end side of the canister 30 in the longitudinal direction. The first rubber member 31 and the second rubber member 32 both have elasticity.

The first rubber member 31 and the second rubber member 32 may be formed integrally with each other.

The first rubber member 31 includes a convex portion 33, and the second rubber member 32 includes a convex portion 34. The first rubber member 31 and the second rubber member 32 are attached to the canister 30 so that the convex portion 33 and the convex portion 34 face opposite directions on a circumferential surface of the canister 30.

The convex portion 33 has a slit 35, and the convex portion 34 has a slit 36.

A bracket 37 is attached to the canister 30 via the first rubber member 31 and the second rubber member 32. The bracket 37 is formed of, for example, a bent piece of sheet metal and is a member that holds the canister 30.

The bracket 37 includes a pair of tabs 38. The tabs 38 are inserted through the slits 35 and 36, respectively, and thus the bracket 37 holds the canister 30.

The bracket 37 that holds the canister 30 in this manner covers a part of the circumferential surface of the canister 30 over an entire region of the canister 30 in the longitudinal direction thereof.

Furthermore, since the bracket 37 holds the canister 30 via the first rubber member 31 and the second rubber member 32 that have elasticity, even in a case where there is a dimensional error between the bracket 37 and the canister 30, the first rubber member 31 and the second rubber member 32 are elastically deformed to eliminate the error.

The bracket 37 is provided with a handle 39. The handle 39 is formed by bending a piece of sheet metal into an S shape.

When the bracket 37 holds the canister 30, the handle 39 covers one end surface of the canister 30. In this case, a vertex of the handle 39 is apart from the end surface of the canister 30 by a predetermined width dimension and protrudes in the longitudinal direction of the canister 30.

This makes it possible for a user to grip the handle 39 while the bracket 37 holds the canister 30.

In this embodiment, the handle 39 covers an end surface of the canister 30 positioned on the end side thereof on which the annular first rubber member 31 is fitted.

The bracket 37 has a mounting hole 40. The mounting hole 40 is provided at a position adjacent to the handle 39.

A bolt 41 is inserted through the mounting hole 40, and as shown in FIG. 2, the bracket 37 is secured to the partition 24 with the bolt 41. Thus, the canister 30 is mounted to the housing 2 via the bracket 37.

Figure 4:
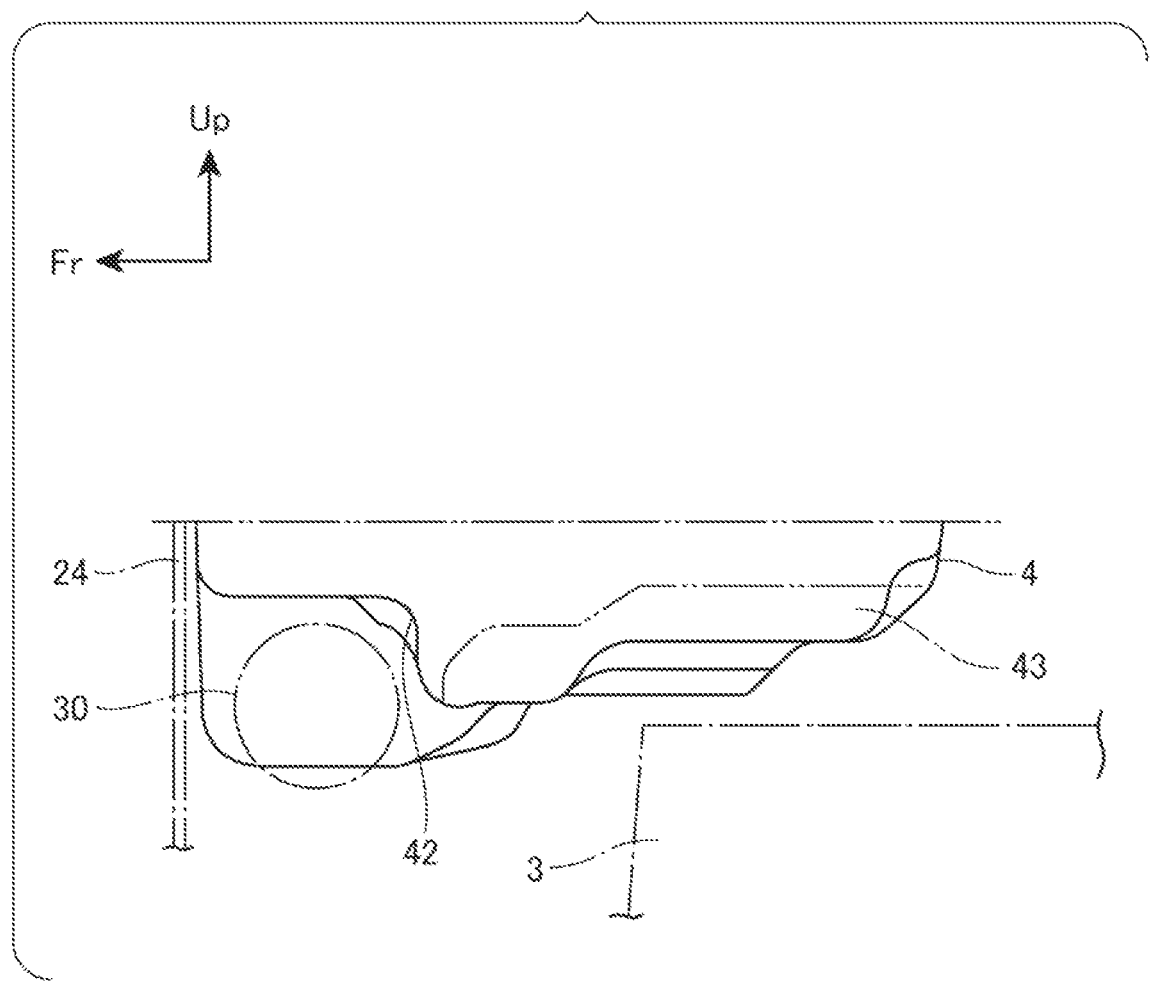
FIG. 4 is a view of a bottom of a fuel tank as viewed from behind the electric generator.
Figure 5:
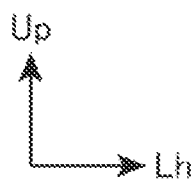
FIG. 5 is a view of the bottom of the fuel tank as viewed from a lateral side of the electric generator.
Figure 5:
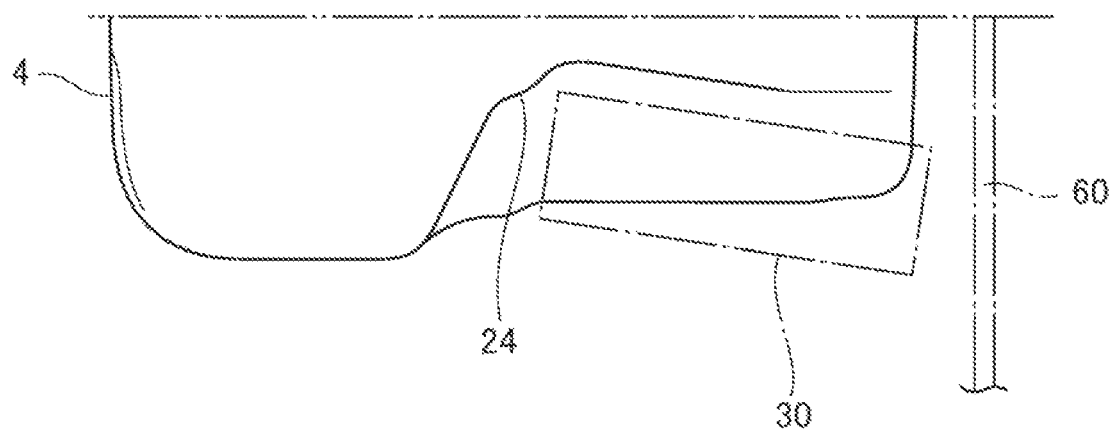

FIG. 4 is a view of the bottom of the fuel tank 4 as viewed from behind the electric generator 1. FIG. 5 is a view of the bottom of the fuel tank 4 as viewed from a lateral side of the electric generator 1.

As described above, the canister 30 is arranged between the fuel tank 4 and the alternator 9. As shown in FIG. 4 and FIG. 5, the fuel tank 4 is provided with a concave portion 42 formed by denting the bottom of the fuel tank 4 upward.

To be more specific, as shown in FIG. 5, the concave portion 42 is formed by denting the bottom of the fuel tank 4 upward from near the side panel 60 of the fuel tank 4 over to substantially a center of the fuel tank 4 in a direction along a left-right direction of the housing 2.

Furthermore, as shown in FIG. 4, the concave portion 42 is formed by denting the bottom of the fuel tank 4 upward in a predetermined width dimension from near the partition 24 along a front-rear direction of the housing 2.

Thus, the canister 30 is housed in the concave portion 42.

To be more specific, the canister 30 is housed in the concave portion 42 so that the longitudinal direction of the canister 30 lies along the left-right direction of the housing 2.

Thus, in the electric generator 1, even a canister having an increased size is used as the canister 30, the canister 30 can be housed inside the housing 2.

Moreover, on the bottom of the fuel tank 4, at a location above the engine 3, a capacity adjusting portion 43 is provided to bulge downward. In the electric generator 1 of this embodiment, the capacity adjusting portion 43 is provided, and thus even in a case where the fuel tank 4 is provided with the concave portion 42, it is possible to suppress a decrease in fuel storage amount of the fuel tank 4.

As shown in FIG. 2, in a state where the first rubber member 31, the second rubber member 32, and the bracket 37 are attached to the canister 30, the canister 30 is inserted between the fuel tank 4 and the fan cover 13 from near the side panel 60. When the canister 30 is inserted between the fuel tank 4 and the alternator 9 in this manner, the convex portion 34 comes into contact with the concave portion 42 of the fuel tank 4, and the convex portion 33 comes into contact with an outer circumferential surface of the fan cover 13.

Thus, the canister 30 inserted between the fuel tank 4 and the alternator 9 is supported by the fuel tank 4 and the fan cover 13 via the convex portions 33 and 34.

As described above, the canister 30 is provided at a position apart from the engine 3. Furthermore, the canister 30 is supported by the fuel tank 4 and the fan cover 13 via the first rubber member 31 and the second rubber member 32.

Thus, even when the engine 3 is driven, vibrations resulting from the driving of the engine 3 are absorbed by the first rubber member 31 and the second rubber member 32. Accordingly, the canister 30 of this embodiment has improved resistance against vibrations resulting from driving of the engine 3.

As described above, when the canister 30 is inserted between the fuel tank 4 and the alternator 9, the handle 39 of the bracket 37 holding the canister 30 is arranged at a position adjacent to the side panel 60.

Furthermore, the canister 30 is arranged above the output shaft 8 and thus is arranged at a position apart from a ground plane Gr of the electric generator 1 as shown in FIG. 1. Thus, in the electric generator 1, even when water is accumulated on the ground plane Gr of the electric generator 1, it is possible to prevent the canister 30 from being submerged therein.

Moreover, the canister 30 is covered above by the fuel tank 4. Thus, the electric generator 1 can prevent the canister 30 from becoming wet even when the electric generator 1 is arranged under a rainfall condition.

As shown in FIG. 1, the canister 30 is arranged at a position adjacent to the partition 24. That is, the canister 30 is arranged on an upstream side of the engine 3 in a flow path of air taken into the interior of the housing 2 through the intake port 19.

Thus, in the electric generator 1, absorption performance of the canister 30 is prevented from deteriorating due to heat generated by the engine 3 and exhaust system auxiliary equipment such as the muffler 22.

The canister 30 is joined to an interior of the fuel tank 4 via a joining pipe.

In the electric generator 1 of this embodiment, since the canister 30 is mounted below the fuel tank 4, it is possible to use a joining pipe having a reduced length.

Furthermore, a tube 50 is connected to the other end surface of the canister 30. The tube 50 is a tubular member that joins the canister 30 to the air cleaner 29 and functions as a flow path through which air and evaporated fuel that have passed through the canister 30 from inside the fuel tank 4 flow.

The tube 50 is provided with a purge cut valve 52. In the tube 50, the purge cut valve 52 is arranged between the canister 30 and the air cleaner 29 and functions as an on-off valve for opening/closing the tube 50. In this embodiment, the purge cut valve 52 opens the tube 50 when the engine 3 is driven and closes the tube 50 when the engine 3 is stopped.

As the purge cut valve 52, there is used any of various types of switching devices such as a check valve and a solenoid valve.

Next, a description is given of an operation of this embodiment.

In the electric generator 1, fuel, such as gasoline, contained in the fuel tank 4 may be vaporized to generate evaporated fuel. For this reason, in the electric generator 1, the canister 30 is provided, and such evaporated fuel is introduced into the canister 30 via the joining pipe so that the evaporated fuel is absorbed on activated carbon included in the canister 30, and thus the evaporated fuel is prevented from leaking to an exterior of the electric generator 1.

The canister 30 is joined to the air cleaner 29 via the tube 50. When the engine 3 is driven, air and evaporated fuel that have passed through the canister 30 from inside the fuel tank 4 are fed from the air cleaner 29 to the engine 3.

This prevents the evaporated fuel from leaking to the exterior of the electric generator 1.

Furthermore, when the engine 3 is stopped, the purge cut valve 52 closes the tube 50.

Thus, air and evaporated fuel that have passed through the canister 30 from inside the fuel tank 4 are prevented from being fed out to the air cleaner 29, and thus the evaporated fuel is prevented from leaking to the exterior of the electric generator 1 via the air cleaner 29.

Figure 6:
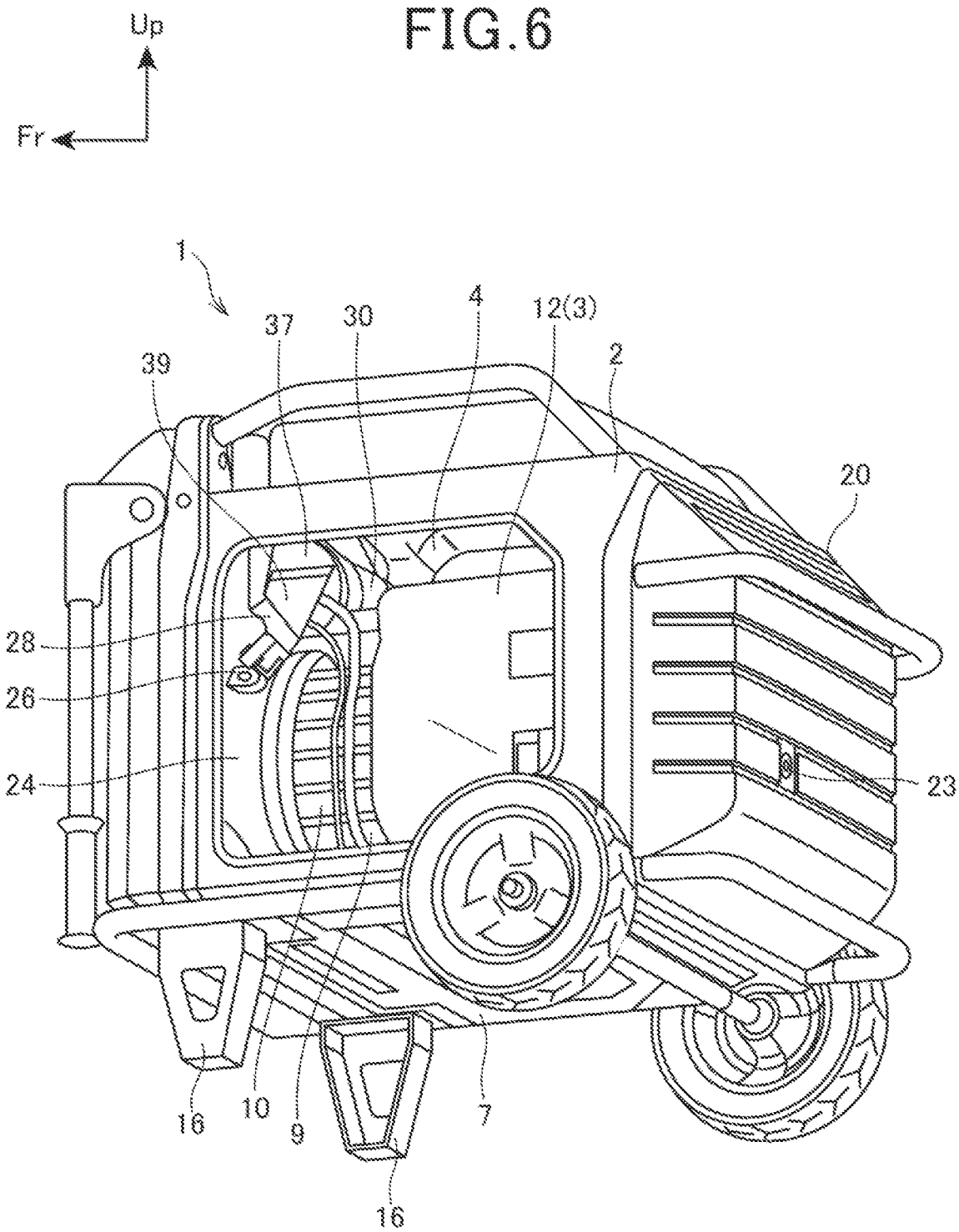
FIG. 6 is a perspective view of the electric generator.

FIG. 6 is a perspective view of the electric generator 1. In FIG. 6, depictions of the side panel 60 and the fan cover 13 are omitted.

As shown in FIG. 6, the recoil grip 28 is arranged at a position adjacent to the one end surface of the canister 30.

As described above, in starting the engine 3, the recoil grip 28 is pulled to start the engine 3. After the engine 3 has been started, the recoil rope 27 that has been pulled out is rewound to pull back the recoil grip 28. The recoil grip 28 thus pulled back comes into contact with the insertion hole 26 to be stopped. In this case, there is a possibility that the recoil rope 27 that has been pulled back comes into contact with the one end surface of the canister 30 provided continuously therewith.

In this embodiment, on the one end surface of the canister 30, there is provided the handle 39 whose vertex is apart from the end surface of the canister 30 by a predetermined width dimension.

Thus, in the electric generator 1, even when the recoil rope 27 is pulled back, the recoil rope 27 comes into contact with the handle 39 and thus can be prevented from coming into contact with the canister 30.

As shown in FIG. 2 and FIG. 6, the canister 30 is provided at a position adjacent to the side panel 60.

Accordingly, at the time of maintenance or the like, a user is given easy access to the canister 30 by opening the side panel 60.

Furthermore, the canister 30 is secured to the partition 24 with the bolt 41 via the bracket 37 and is supported by the fuel tank 4 and the fan cover 13 via the first rubber member 31 and the second rubber member 32.

Accordingly, at the time of maintenance or the like, a user removes the bolt 41 and grasps the handle 39 to pull it out and thus can pull out the canister 30 together with the bracket 37.

That is, with the handle 39 of the bracket 37 being grasped, the canister 30 is mounted/demounted together with the bracket 37.

In this manner, the canister 30 can be easily mounted/demounted to/from the electric generator 1.

As discussed thus far, according to this embodiment, in the electric generator 1, the engine 3 is arranged in the lower part of the housing 2, the alternator 9 and the fan 10 are coaxially joined to the output shaft 8 of the engine 3, and the recoil starter 11 that starts the engine 3 is arranged in front of the fan 10. Furthermore, the fuel tank 4 is arranged in the upper part of the housing 2. Further, the canister 30 containing activated carbon is joined to the fuel tank 4, and the canister 30 is arranged between the alternator 9 joined to the output shaft 8 and the fuel tank 4.

According to this configuration, in the electric generator 1, even when a canister having an increased size is used as the canister 30, the canister 30 can be appropriately arranged.

Accordingly, in the electric generator 1, evaporated fuel can be more reliably prevented from leaking to the exterior.

Furthermore, according to this embodiment, the concave portion 42 for receiving the canister 30 is formed at the bottom of the fuel tank 4.

According to this configuration, in the electric generator 1, the canister 30 can be arranged between the alternator 9 and the fuel tank 4. Accordingly, in the electric generator 1, the canister 30 can be arranged apart from the engine 3 and the exhaust system auxiliary equipment such as the muffler 22, and thus absorption performance of the canister 30 is prevented from deteriorating. Moreover, in the electric generator 1, a space for additionally arranging other exhaust system auxiliary equipment components and so on can be provided in a vicinity of the engine 3.

Furthermore, according to this embodiment, the bracket 37 is attached to the canister 30 via the first rubber member 31 and the second rubber member 32, and the canister 30 is mounted/demounted together with the bracket 37.

According to this configuration, the canister 30 is secured to the partition 24 with the bolt 41 via the bracket 37 and is supported by the fuel tank 4 and the fan cover 13 via the first rubber member 31 and the second rubber member 32.

Accordingly, in the electric generator 1, by removing the bolt 41, it is possible to easily pull out the canister 30 together with the bracket 37.

Furthermore, according to this embodiment, the bracket 37 is provided with the handle 39.

According to this configuration, in the electric generator 1, by removing the bolt 41, it is possible to mount/demount the canister 30 together with the bracket 37 while grasping the handle 39. Accordingly, in the electric generator 1, the canister 30 can be easily mounted/demounted.

Furthermore, according to this embodiment, the purge cut valve 52 is joined to the canister 30, and the purge cut valve 52 is arranged between the housing 2 and the fuel tank 4.

According to this configuration, when the engine 3 is stopped, the purge cut valve 52 can close the tube 50. Accordingly, in the electric generator 1, evaporated fuel can be prevented from leaking to the exterior of the electric generator 1.

The above-described embodiment exemplifies one aspect of the present invention and can be arbitrarily modified and applied without departing from the spirit of the present invention.

In the above-described embodiment, the canister 30 is arranged between the alternator 9 and the fuel tank 4. There is, however, no limitation thereto, and the canister 30 may be arranged, for example between the fan 10 or the recoil starter 11 and the fuel tank 4. That is, below the fuel tank 4, the canister 30 may be provided at any position above the output shaft 8 and apart from the engine 3.

Furthermore, while in the above-described embodiment, the canister 30 is mounted to the housing 2 via the bracket 37, there is no limitation thereto, and a configuration without the bracket 37 may adopted. That is, the canister 30 may be supported by the fuel tank 4 and the fan cover 13 only via the first rubber member 31 and the second rubber member 32.

REFERENCE SIGNS LIST 1 electric generator
2 housing
3 engine
4 fuel tank
8 output shaft
9 alternator
10 fan
11 recoil starter
13 fan cover
30 canister
31 first rubber member (rubber member)
32 second rubber member (rubber member)
37 bracket
39 handle
42 concave portion
50 tube
52 purge cut valve

What is claimed is:
1. An electric generator, comprising:
an engine that is arranged in a lower part of a housing;
an alternator and a fan that are coaxially joined to an output shaft of the engine;
a recoil starter that starts the engine, the recoil starter arranged in front of the fan;
a fuel tank that is arranged in an upper part of the housing; and
a canister that contains activated carbon, the canister arranged between the fuel tank and the output shaft, wherein a concave portion for receiving the canister is formed at a bottom of the fuel tank.

2. The electric generator according to claim 1, wherein a bracket is attached to the canister via a rubber member, and the canister is mounted and demounted together with the bracket.

3. The electric generator according to claim 2, wherein the bracket is provided with a handle.

4. The electric generator according to claim 1, wherein a purge cut valve is joined to the canister, and the purge cut valve is arranged between the housing and the fuel tank.

* * * * *